Dec. 13, 1960    M. J. IRLAND ET AL    2,963,938
SURFACE METERS FOR DETECTING IRREGULARITIES
ON TRANSPARENT ELEMENTS
Filed March 26, 1956

M.J. IRLAND
H.A. TUTTLE
*INVENTOR.*

BY *E.C. McRae*
*J.R. Faulkner*
*F.H. Oster*
*R.F. Seeger*

ATTORNEYS

United States Patent Office 2,963,938
Patented Dec. 13, 1960

2,963,938

SURFACE METERS FOR DETECTING IRREGULARITIES ON TRANSPARENT ELEMENTS

Max J. Irland and Henry A. Tuttle, Dearborn, Mich., assignors to The Ford Motor Company, Dearborn, Mich., a corporation of Delaware Filed Mar. 26, 1956, Ser. No. 573,886

3 Claims. (Cl. 88—14)

This invention pertains to surface meters generally and more particularly to a meter for detecting surface irregularities on a polished transparent plate surface.

It is desirable to produce for certain uses a highly polished transparent plate glass surface. In order that production processes for producing such a surface can be properly evaluated a sensitive, accurate meter for checking the results of a particular process is necessary. The methods and instruments of the prior art for detecting such surface irregularities while adequate for certain limited uses have proven generally unsatisfactory and have lacked the necessary sensitivity for indicating the necessary degree of surface smoothness that is required for such highly polished surfaces. With the teaching of the invention in this application, accurate reproducible results are obtainable for detecting minute surface irregularities.

This invention employs a beam of light of predetermined intensity and focus. The beam is caused to pass through a specimen to be tested and hence to a photocell. With the construction shown in this invention it is possible for a larger percentage of the rays scattered by the irregularities of the specimen surface to be detected for correspondingly more sensitive and more accurate surface readings. In fact, the arrangement of the instrument of this invention provides for a degree of sensitivity that makes unnecessary an amplifying circuit for such readings.

The construction, objects and advantages of the invention thus described will be covered in more detail and in conjunction with the drawings in which:

Figure 1 shows a schematic diagram of the mechanical and electrical elements of an embodiment of this invention while;

Figure 1:
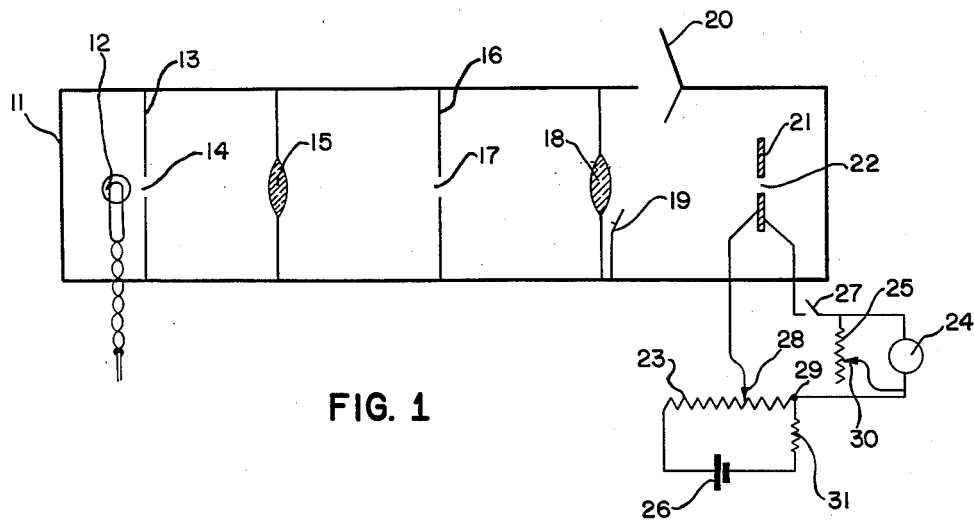

In Figure 1 may be seen box 11 with light source 12 which may be of any wave length to which a photocell is sensitive, and baffle 13 with aperture 14, lens 15, baffle 16 with aperture 17, lens 18, speciment holder 19, and photocell 21. Light source 12 is fixed so that it is in approximate alignment with aperture 14, lens 15, aperture 17 and lens 18. The purpose of the baffles apertures, and the lenses is to protect a controlled beam of light through the material to be tested and towards photocell 21 which has opening 22 therein, the test material being positioned on holder 19. The inner walls of box 11 may be blackened so as to reduce undesired reflection. Door 20 is hinged to box 11 above holder 19 providing access thereto. Photocell 21 is positioned in the right end portion of box 11 so that the undisturbed beam of light passing through lens 18 is focused to fall within opening 22, the cross sectional area of the light beam being substantially equal to but slightly less than the cross-sectional area of the opening. Light source 12 is preferably an instrument bulb with prefocus based rated 6.5 volt and 2.75 amp. Lenses 15 and 19 may be and are preferably coated achromats of 46 millimeter diameter and 79 millimeter EFL. Photocell 21 is, in the preferred embodiment, a circular photovoltaic cell with a one half inch central opening, although the form and shape of this cell may be changed without departing from the scope of this invention.

The leads from photocell 21 connect to movable contact 28 and switch 27. Contact 28 may be moved along resistance 23 which is connected across battery 26. Between battery 26 and resistance 23 is placed resistance 31 for keeping the current to a desired level. Connected between switch 27 and junction 29 is galvanometer 24 which is bypassed by variable resistance 25. In this embodiment resistance 23 may be 100 ohms, resistance 31 may be 10,000 ohms and variable resistance 25 may have a full value of 1000 ohms although these of course are in no way limiting of this invention. Battery 26 may be a dry cell or other source of steady voltage.

Figure 2:
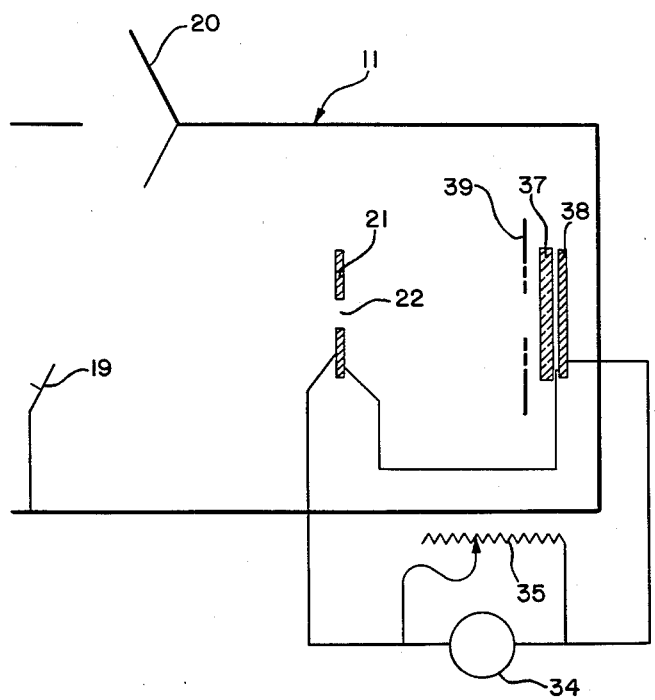
Figure 2 shows a partial schematic view of a second embodiment of this invention.

In Figure 2 is shown the end portion of box 11 to the right of lens 18. In this embodiment one of the leads from photocell 22 connects directly to galvanometer 34 which is bypassed by variable resistance 35. The other lead from photocell 22 is connected to a second photocell 38 which has its other lead connected to the other side of galvanometer 34. Interposed photocells 21, 38 is iris diaphragm 39 and filter 37. Filter 37 reduces the intensity of the light beam passing through aperture 22 of photocell 21. Diaphragm 39 is a variable control of the light available to cell 38.

The operations of these embodiments are as follows:

In Figure 1 light from source 12 is first defined by aperture 14, then passes to and is focused by lens 15 through aperture 17 onto lens 18. Lens 18 focuses the light beam upon the photocell aperture 22 so that substantially none of it impinges upon the light sensitive portion of the photocell 21. With holder 19 empty and light source 12 illuminated, the system shown in Figure 1 may be zeroed to adjust for any accidental impingement of the light beam or the indicator of meter 24 brought to a desired station by moving contact 28 along resistance 23 thereby varying the amount of potential from battery 26 to be placed across meter 24. Movement of contact 28 to the left will increase the potential across meter 24 while movement of contact 28 to the right will decrease said potential. Since battery 26 opposes the output of cell 21, resistance 28 may be adjusted so that meter 24 is zeroed or nulled with no specimen in holder 19. In this way the effect of stray light due to scattering by dust or lens blemishes is cancelled. Contact 30 on variable resistance 25 may be adjusted to control the sensitivity of meter 24. Now a plate to be tested may be placed in holder 19 and door 20 closed. Any irregularities on the surface of the test plate will cause the focused beam of light coming from lens 18 to be somewhat scattered thereby causing light rays to impinge upon cell 21 resulting in a deflection of meter 24. With relatively low illumination there is virtually a linear relationship between the deflection of meter 24 and the surface irregularities of the plate to be tested which adds to the value and advantages of this instrument. With this arrangement even the slightest of irregularities are perceptible due to the fact that photocell 21 is nearly adjacent the main beam of light so that any variation of the beam from the pre-focused area will result in deflection of meter 24. With a prototype structure embodying the present invention, it was found that photocell 21 receives about ⅔ of the scattered light and that this proportion may be increased or decreased by varying the size of the photocell. For example, with an outside diameter of 1½" photocell 21 receives approximately ½ the scattered light and has satisfactory results. A lower proportion of received light is contemplated by this invention to produce satisfactory results.

In Figure 2 another way of mounting meter 34 is shown. In this embodiment a plate glass of standard polish is inserted in holder into the box on to holder 19 and diaphragm 39, is adjusted until the potential from cell 38 balances that from cell 21 thereby giving a zero or other desired reading on meter 34. As diaphragm 39 is closed less light will reach cell 38 thereby decreasing the potential and conversely as diaphragm 39 is opened more potential will be available from cell 38. In this manner the plate or specimen tested will indicate positive or to one side of the zero reading if it is better than the standard plate and negative or to the other side of the zero reading if they are inferior to the standard plate. A superior plate will give a stronger central beam which will not only energize cell 38 to a greater degree but will cause less potential development by cell 21 thereby causing a deflection to one side of meter 34. An inferior plate will cause a greater scattering of rays more or greater energizing of cell 21 with a lesser amount of rays passing through to cell 38 thereby causing the meter to deflect to the other side of the zero reading.

It will be understood that the invention is not to be limited to the exact construction shown and described, but that various changes and modifications may be made without departing from the spirit and scope of the invention, as defined in the appended claims.

What is claimed is:

1. A device for indicating surface polish quality of a transparent plate comprising a light source, lens means for forming a defined beam from said source, a support adapted to hold a plate to be tested in position to intersect said beam, a first photoelectric cell defining an annulus, said annulus being aligned with said beam subsequent to said support to normally pass substantially all of said beam therethrough, said annulus being effective to intercept substantially all of the portion of said beam diffused by surface irregularities on a plate positioned in said holder, a second photoelectric cell positioned to receive the undiffused portion of said beam passing through said first cell, means interposed between said first cell and said second cell for adjusting the quantum of light on said second cell, the voltage output of said first cell being connected in opposed voltage relationship through an electrical indicator to the output of said second cell.

2. In a device for detecting surface irregularities on a transparent plate comprising a housing, a light source, light controlling means, a plate holder, said light controlling means being between said source and plate holder so that a beam of light of predetermined projected area impinges upon a plate to be tested in said holder, the projected area of said beam being distorted by surface irregularities on said plate, a first photocell being substantially aligned with said beam of light to receive said beam subsequent to passing through said plate, a portion of said first photocell being insensitive to the part of said beam within said predetermined projected area and designed to pass said part, a further portion of said first photocell being sensitive to the part of said beam outside of said predetermined projected area, a second photocell placed to receive the part of said beam within said predetermined projected area subsequent to said first photocell, a current sensitive member, means connecting said first and second photocells through said member in voltage opposition, whereby the output of said first photocell may be balanced by the output of said second photocell.

3. A device for detecting surface irregularities on a transparent plate, comprising a housing, a light source, a plate holder adapted to receive a transparent plate to be tested, light controlling means between said light source and one side of said plate holder effective to concentrate light from said light source into a controlled beam and to project the same beyond said plate holder, and a photocell having a light sensitive area surrounding a light insensitive area, said photocell being mounted on the opposite side of said plate holder in position to intercept said projected beam at a point at which the projected area of said beam covers a predetermined portion of said photocell light insensitive area, and galvanometer means electrically connected to said photocell for measuring the excitation of the latter upon impingement of light on its light sensitive area resulting from distortion of said projected area of the controlled beam when a transparent plate having surface irregularities is placed in said plate holder in position to intercept said controlled beam.

References Cited in the file of this patent

UNITED STATES PATENTS

| 2,254,062 | Devol | Aug. 26, 1941 |
| 2,311,101 | Tuttle et al. | Feb. 16, 1943 |
| 2,617,940 | Giguere | Nov. 11, 1952 |

FOREIGN PATENTS

| 459,278 | Great Britain | Jan. 5, 1937 |
| 640,691 | Great Britain | July 26, 1950 |